US008649502B2

(12) United States Patent
Chang et al.

(10) Patent No.: US 8,649,502 B2
(45) Date of Patent: Feb. 11, 2014

(54) PROTECTION COVER MECHANISM WITH ENHANCED SPACE UTILIZATION

(75) Inventors: Jung-Wen Chang, Tao Yuan Shien (TW); Ming-Yuan Lan, Tao Yuan Shien (TW); Ching-Chung Wang, Tao Yuan Shien (TW); Lin-Wei Huang, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 6 days.

(21) Appl. No.: 13/450,275

(22) Filed: Apr. 18, 2012

(65) Prior Publication Data

US 2013/0145697 A1    Jun. 13, 2013

(30) Foreign Application Priority Data

Dec. 8, 2011 (TW) .............................. 100145296 A

(51) Int. Cl.
*H04M 5/00* (2006.01)
(52) U.S. Cl.
USPC ........... 379/330; 379/331; 379/426; 379/427; 379/428.01; 379/447
(58) Field of Classification Search
USPC ................ 379/433.11, 433.13, 437, 447, 454
See application file for complete search history.

(56) References Cited

U.S. PATENT DOCUMENTS

| 8,077,854 | B2 * | 12/2011 | Ou et al. | 379/330 |
|---|---|---|---|---|
| 8,325,163 | B2 * | 12/2012 | Liang et al. | 345/179 |
| 2005/0285991 | A1 * | 12/2005 | Yamazaki | 349/58 |
| 2006/0060762 | A1 * | 3/2006 | Chan et al. | 250/221 |
| 2006/0093134 | A1 * | 5/2006 | Ito | 379/433.13 |
| 2007/0229727 | A1 * | 10/2007 | Yamazaki | 349/58 |
| 2010/0008028 | A1 * | 1/2010 | Richardson et al. | 361/679.01 |
| 2011/0026202 | A1 * | 2/2011 | Kai et al. | 361/679.01 |
| 2011/0157794 | A1 * | 6/2011 | Hamada | 361/679.01 |

* cited by examiner

*Primary Examiner* — Joseph J Nguyen
(74) *Attorney, Agent, or Firm* — McClure, Qualey & Rodack, LLP

(57) ABSTRACT

A protection cover mechanism is disclosed. A hollow hinge tube is connected to a protective cover. A first hinge cover body is connected to the hollow hinge tube and includes a positioning rib. A spring is disposed in the first hinge cover body and abuts the hollow hinge tube. A hollow driven member is movably disposed in the first hinge cover body and abuts the spring. The spring is abutted between the hollow hinge tube and the hollow driven member. The hollow driven member includes a protrusion. The positioning rib is positioned on the hollow driven member, forcing the hollow driven member to move linearly with respect to the first hinge cover body. A fixing base includes a hollow tube fit on the hollow driven member and having an annular inner guide track with an undulated profile. The protrusion abuts the annular inner guide track.

10 Claims, 12 Drawing Sheets

PROTECTION COVER MECHANISM WITH ENHANCED SPACE UTILIZATION

CROSS REFERENCE TO RELATED APPLICATIONS

This Application claims priority of Taiwan Patent Application No. 100145296, filed on Dec. 8, 2011, the entirety of which is incorporated by reference herein.

BACKGROUND OF THE INVENTION

1. Field of the Invention

The invention relates to a protection cover mechanism, and more particularly to a protection cover mechanism with enhanced space utilization.

2. Description of the Related Art

A protective cover is commonly employed in an electronic device (e.g. a cellular phone, a tablet computer, etc.), protecting the electronic device from damage caused by scratches. Moreover, a hinge is often arranged in a conventional protective cover, providing a clicking effect for an operator during turning operation of the conventional protective cover.

Additionally, when a stylus is further arranged in the electronic device, a space for arranging the stylus is adversely affected by the hinge. Namely, the electronic device must provide an additional space for arrangement of the stylus, adversely affecting the aesthetic appearance of the electronic device.

Hence, there is a need for a protection cover mechanism capable of simultaneously providing a clicking effect for an operator during turning operation of a protective cover and accommodating a stylus.

BRIEF SUMMARY OF THE INVENTION

A detailed description is given in the following embodiments with reference to the accompanying drawings.

An exemplary embodiment of the invention provides a protection cover mechanism comprising a protective cover, a hollow hinge tube, a first hinge cover body, a spring, a hollow driven member, and a fixing base. The hollow hinge tube is connected to the protective cover. The first hinge cover body is connected to the hollow hinge tube and comprises at least one positioning rib. The spring is disposed in the first hinge cover body and abuts the hollow hinge tube. The hollow driven member is movably disposed in the first hinge cover body and abuts the spring. The spring is abutted between the hollow hinge tube and the hollow driven member. The hollow driven member comprises a protrusion. The positioning rib of the first hinge cover body is positioned on the hollow driven member, forcing the hollow driven member to move linearly with respect to the first hinge cover body. The fixing base comprises a hollow tube fit on the hollow driven member and having an annular inner guide track with an undulated profile. The protrusion of the hollow driven member abuts the annular inner guide track. When the protective cover rotates with respect to the fixing base, the protrusion of the hollow driven member slides along the annular inner guide track of the fixing base and the hollow driven member forces the spring to be compressed and released, providing a clicking effect.

The hollow tube further comprises a stopper connected to the annular inner guide track, limiting sliding of the protrusion of the hollow driven member.

The protection cover mechanism further comprises a resilient tenon fit in the hollow tube of the fixing base.

The protection cover mechanism further comprises a second hinge cover body connected to the first hinge cover body. The first and second hinge cover bodies surround and cover the hollow hinge tube, spring, and hollow driven member.

The hollow hinge tube comprises a first engaging portion. The first hinge cover body further comprises a second engaging portion engaging the first engaging portion.

The first engaging portion comprises a hole/hook and the second engaging portion comprises a hook/hole.

The fixing base further comprises a fixing portion through which the fixing base is fixed to an operational device.

The protection cover mechanism further comprises a hollow stylus cover connected to the hollow tube of the fixing base.

The resilient tenon is fixed to the fixing base.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
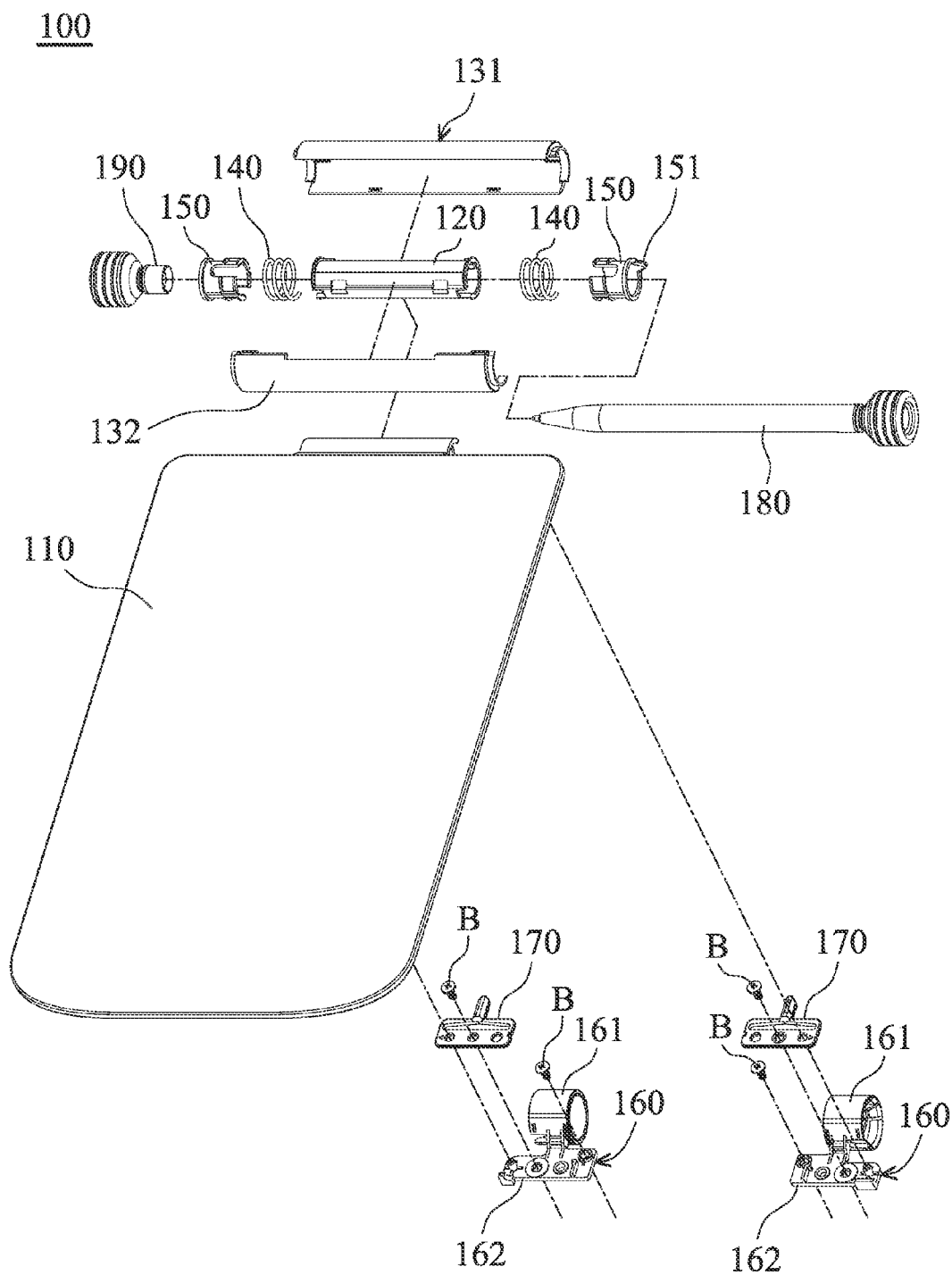
FIG. 1 is an exploded perspective view of a protection cover mechanism of the invention.

Referring to FIG. 1, a protection cover mechanism 100 for an operational device (e.g. a cellular phone, a tablet computer, etc.) comprises a protective cover 110, a hollow hinge tube 120, a first hinge cover body 131, two springs 140, two hollow driven members 150, a second hinge cover body 132, two fixing bases 160, two resilient tenons 170, and a hollow stylus cover 190.

Figure 2:
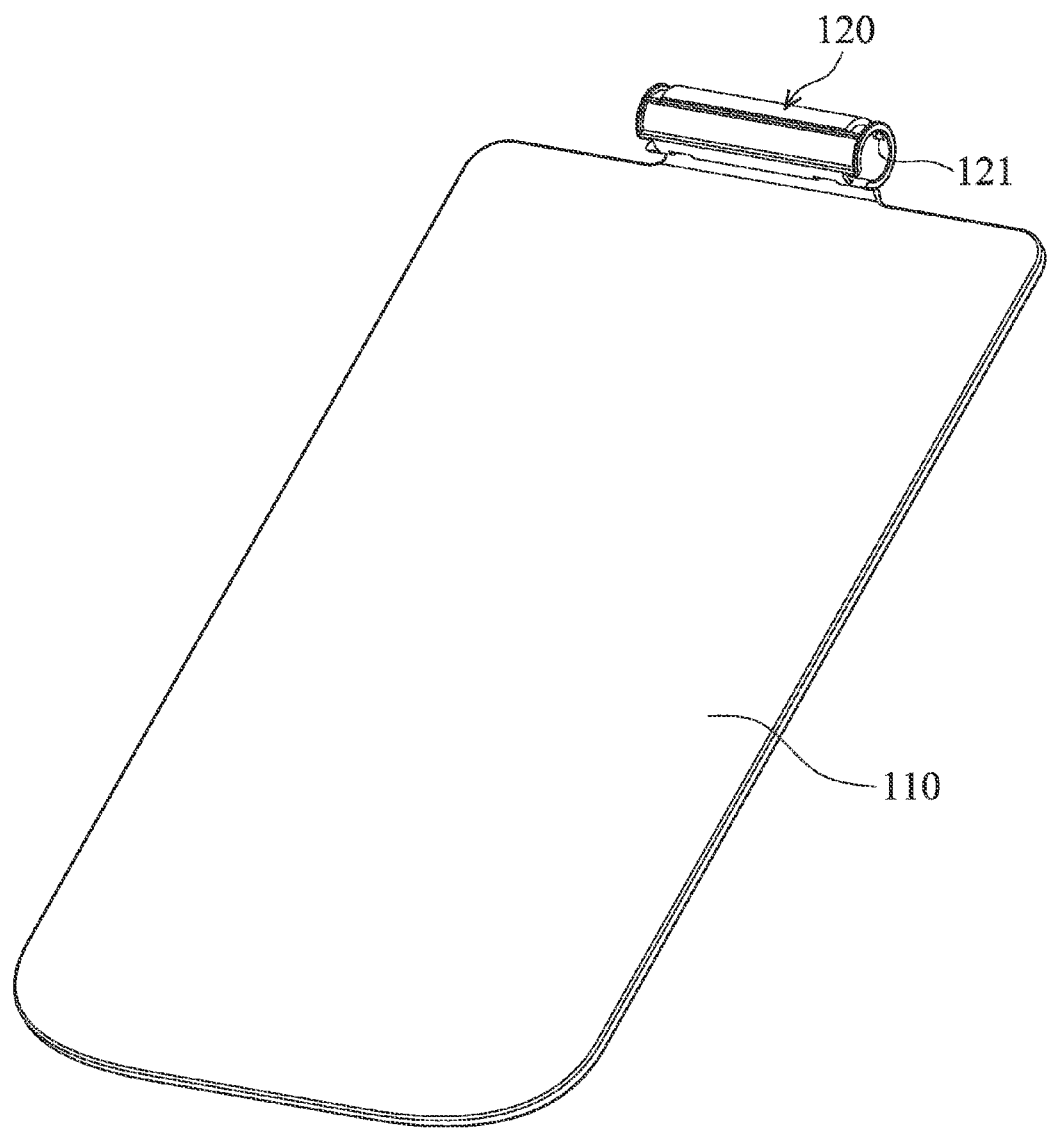
FIG. 2 is a schematic view showing an assembly process of the protection cover mechanism of the invention.

As shown in FIG. 2, the hollow hinge tube 120 is connected to the protective cover 110 and comprises a first engaging portion 121. In this embodiment, the hollow hinge tube 120 adheres to the protective cover 110 and the first engaging portion 121 is a hole.

Figure 3:
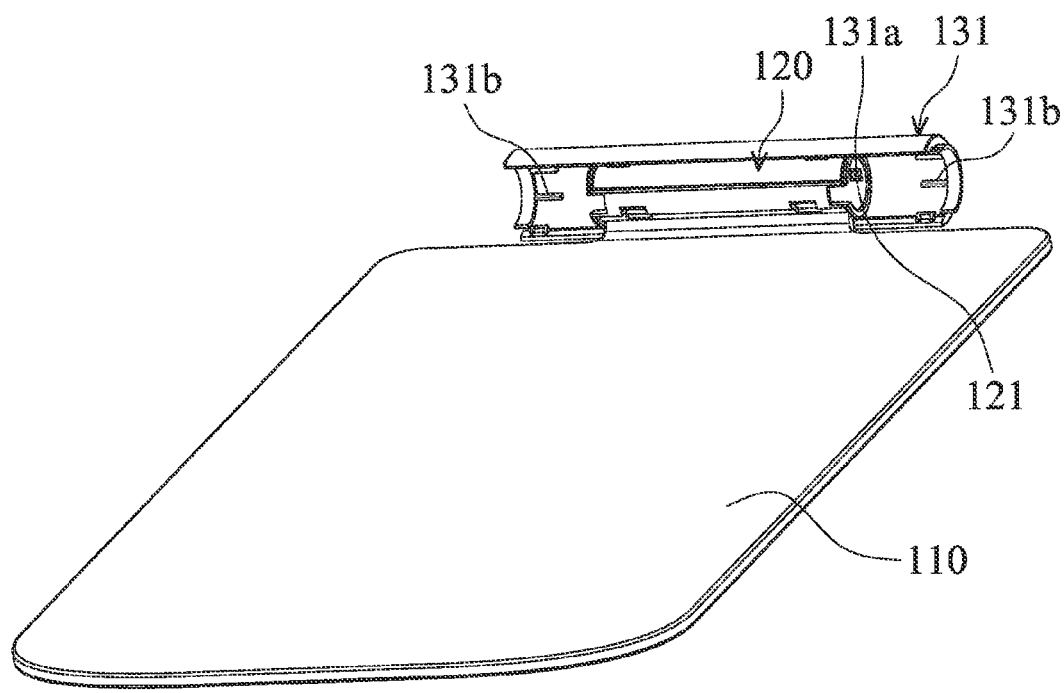
FIG. 3 is another schematic view showing the assembly process of the protection cover mechanism of the invention.

As shown in FIG. 3, the first hinge cover body 131 is connected to the hollow hinge tube 120 and comprises a second engaging portion 131a and two opposite positioning ribs 131b. In this embodiment, the second engaging portion 131a is a hook. Thus, by engagement between the first engaging portion 121 and the second engaging portion 131a, the first hinge cover body 131 can be connected to the hollow hinge tube 120. Alternatively, the first engaging portion 121 may be a hook, while the second engaging portion 131a may be a hole engaged with the hook.

Figure 4:
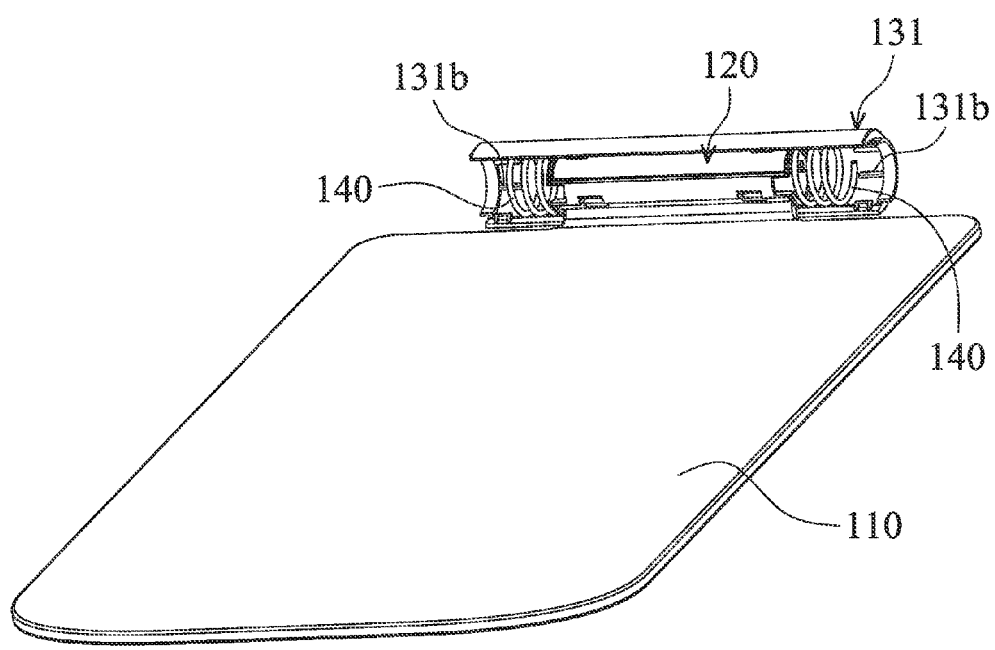
FIG. 4 is yet another schematic view showing the assembly process of the protection cover mechanism of the invention.

As shown in FIG. 4, the springs 140 are disposed in the first hinge cover body 131 and respectively abut two ends of the hollow hinge tube 120.

Figure 5:
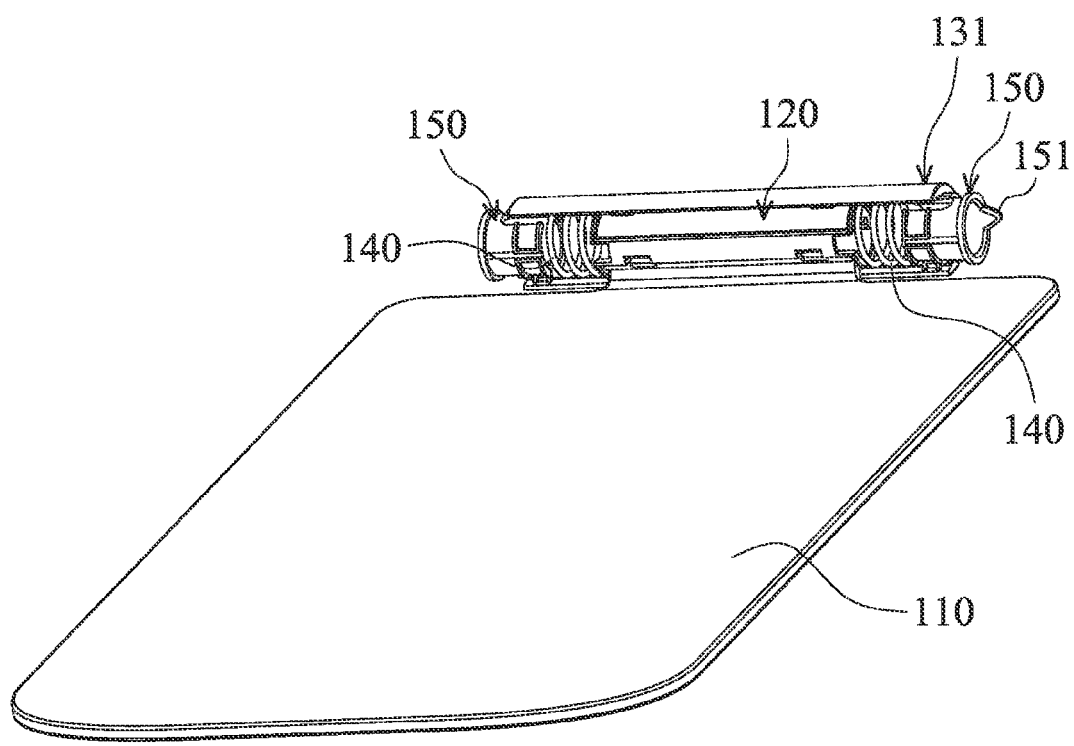
FIG. 5 is still another schematic view showing the assembly process of the protection cover mechanism of the invention.

As shown in FIG. 5, the hollow driven members 150 are movably disposed in the first hinge cover body 131 and respectively abut the springs 140. Namely, each spring 140 is abutted between the hollow hinge tube 120 and each hollow driven member 150. Specifically, the positioning ribs 131b of the first hinge cover body 131 are respectively positioned on the hollow driven members 150, forcing the hollow driven members 150 to move linearly with respect to the first hinge cover body 131. Namely, the hollow driven members 150 can move only along a central axis of the first hinge cover body 131 and cannot rotate. Moreover, as shown in FIG. 5, each hollow driven member 150 comprises a protrusion 151.

Figure 6:
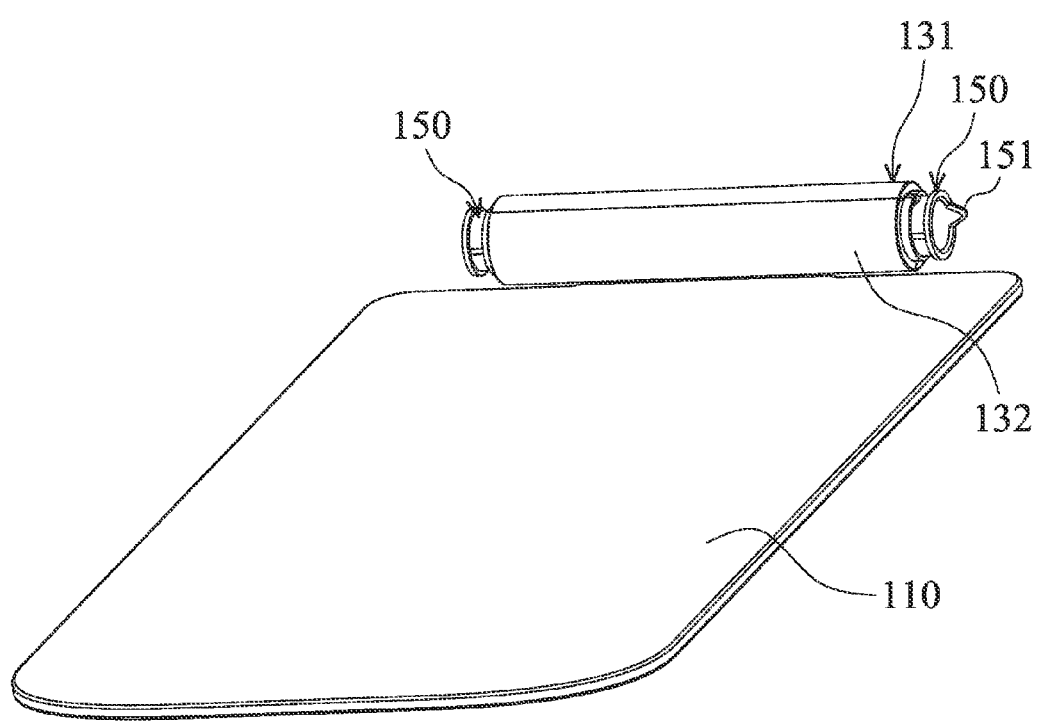
FIG. 6 is still another schematic view showing the assembly process of the protection cover mechanism of the invention.

As shown in FIG. 6, the second hinge cover body 132 is connected to the first hinge cover body 131. Here, the first hinge cover body 131 and second hinge cover body 132 surround and cover the hollow hinge tube 120, springs 140, and hollow driven members 150.

Figure 7:
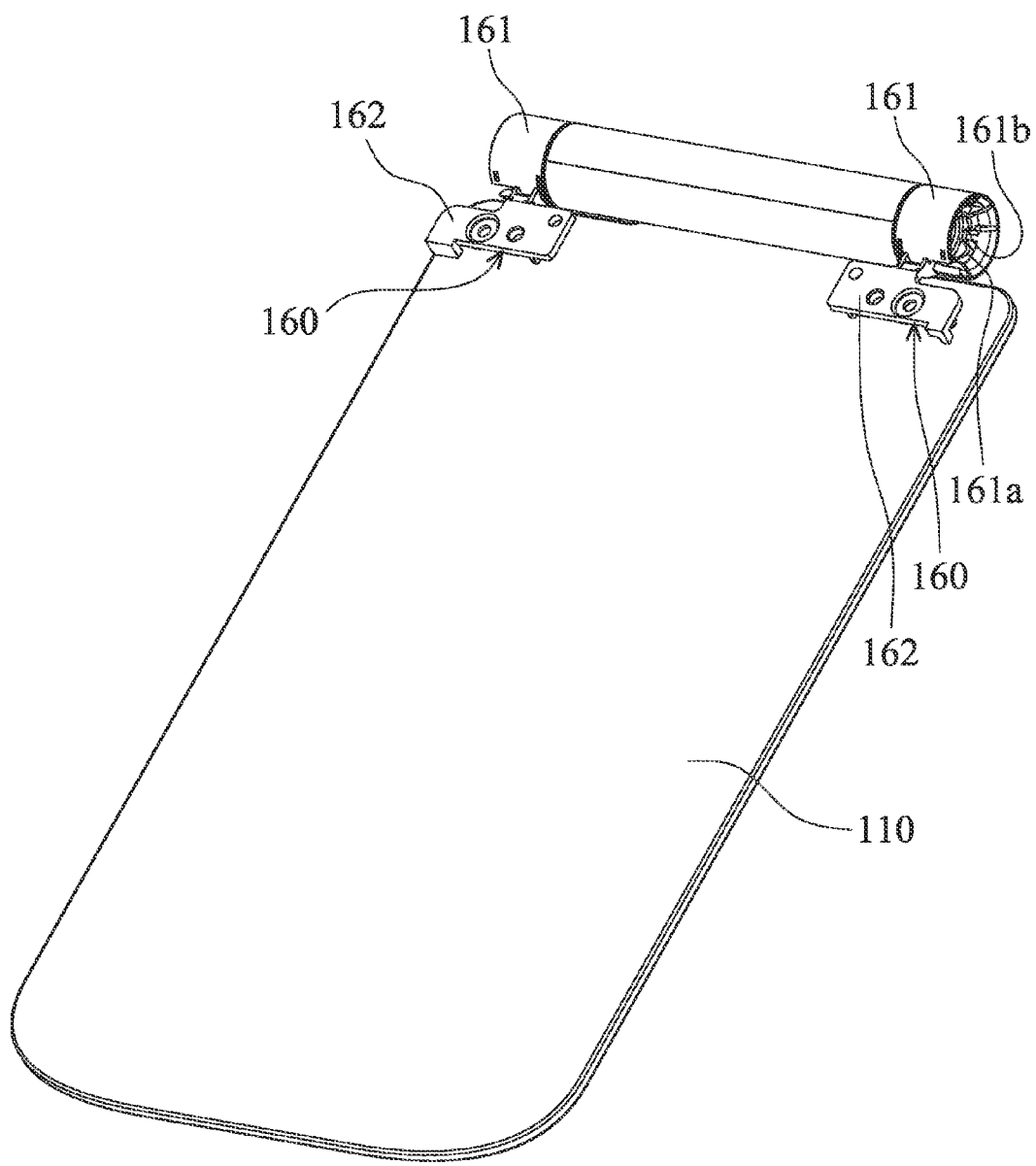
FIG. 7 is still another schematic view showing the assembly process of the protection cover mechanism of the invention.
Figure 8A:
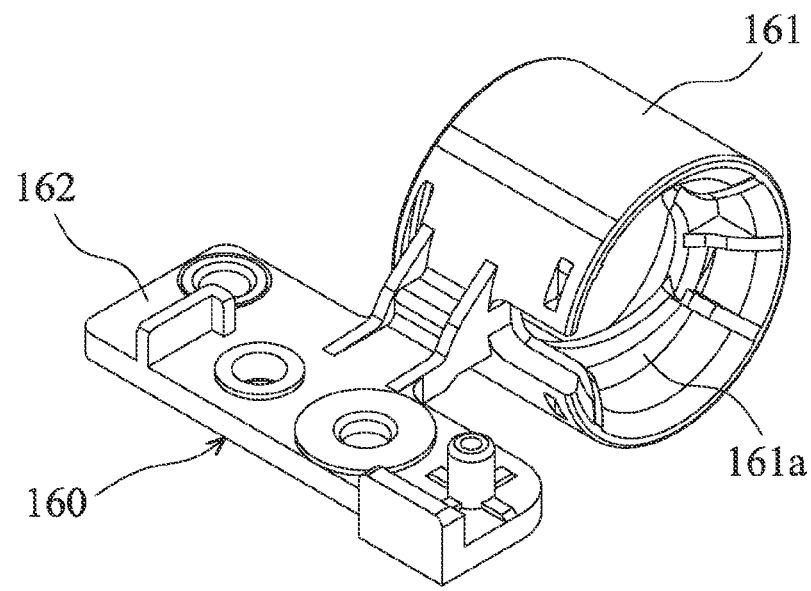
FIG. 8A is a schematic perspective view of a fixing base of the protection cover mechanism of the invention.
Figure 8B:
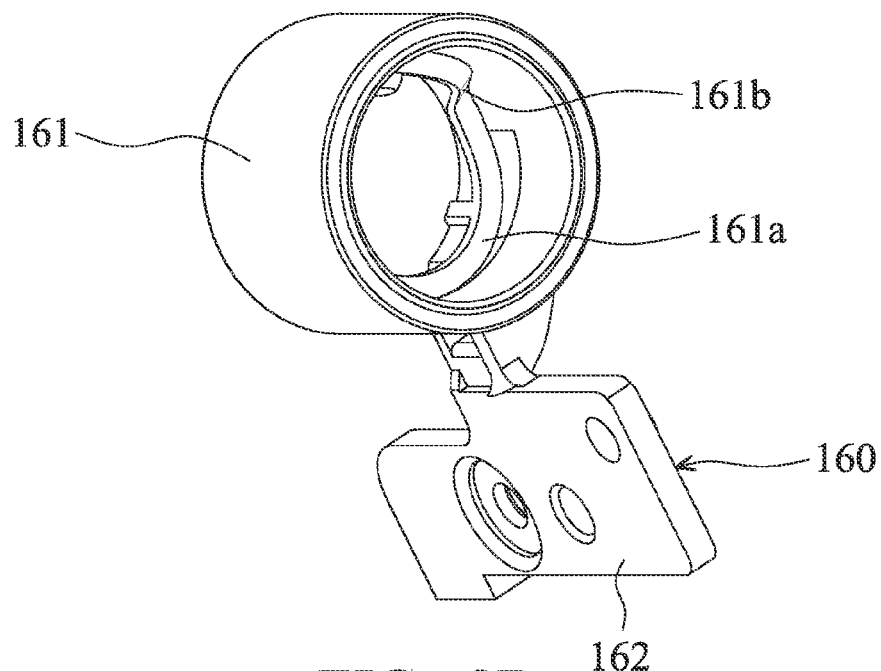
FIG. 8B is another schematic perspective view of the fixing base of the protection cover mechanism of the invention.
Figure 8C:
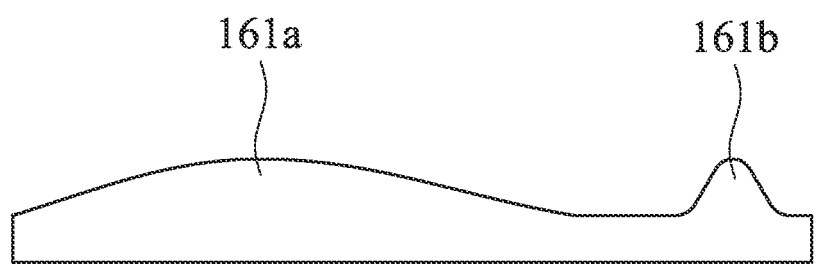
FIG. 8C is an expanded plane view of an annular inner guide track and a stopper of a hollow tube of the fixing base of the protection cover mechanism of the invention.

As shown in FIGS. 7, 8A, and 8B, each fixing base 160 comprises a hollow tube 161 and a fixing portion 162. Each hollow tube 161 is fit on each hollow driven member 150 and has an annular inner guide track 161a with an undulated profile and a stopper 161b (as shown in FIG. 8C, an expanded plane view of the annular inner guide track 161a and stopper 161b is depicted). When the hollow tubes 161 are respectively fit on the hollow driven members 150, the protrusion 151 of each hollow driven member 150 abuts the annular inner guide track 161a of each hollow tube 161. Accordingly, when the protective cover 110 rotates with respect to the fixing bases 160, the protrusion 151 of each hollow driven member 150 slides along the annular inner guide track 161a of the hollow tube 161 of each fixing base 160, such that the hollow driven members 150 force the springs 140 to be compressed and released, thereby providing a clicking effect for an operator. Moreover, in each hollow tube 161, the stopper 161b is connected to the annular inner guide track 161a, limiting sliding of the protrusion 151 of each hollow driven member 150.

Figure 9:
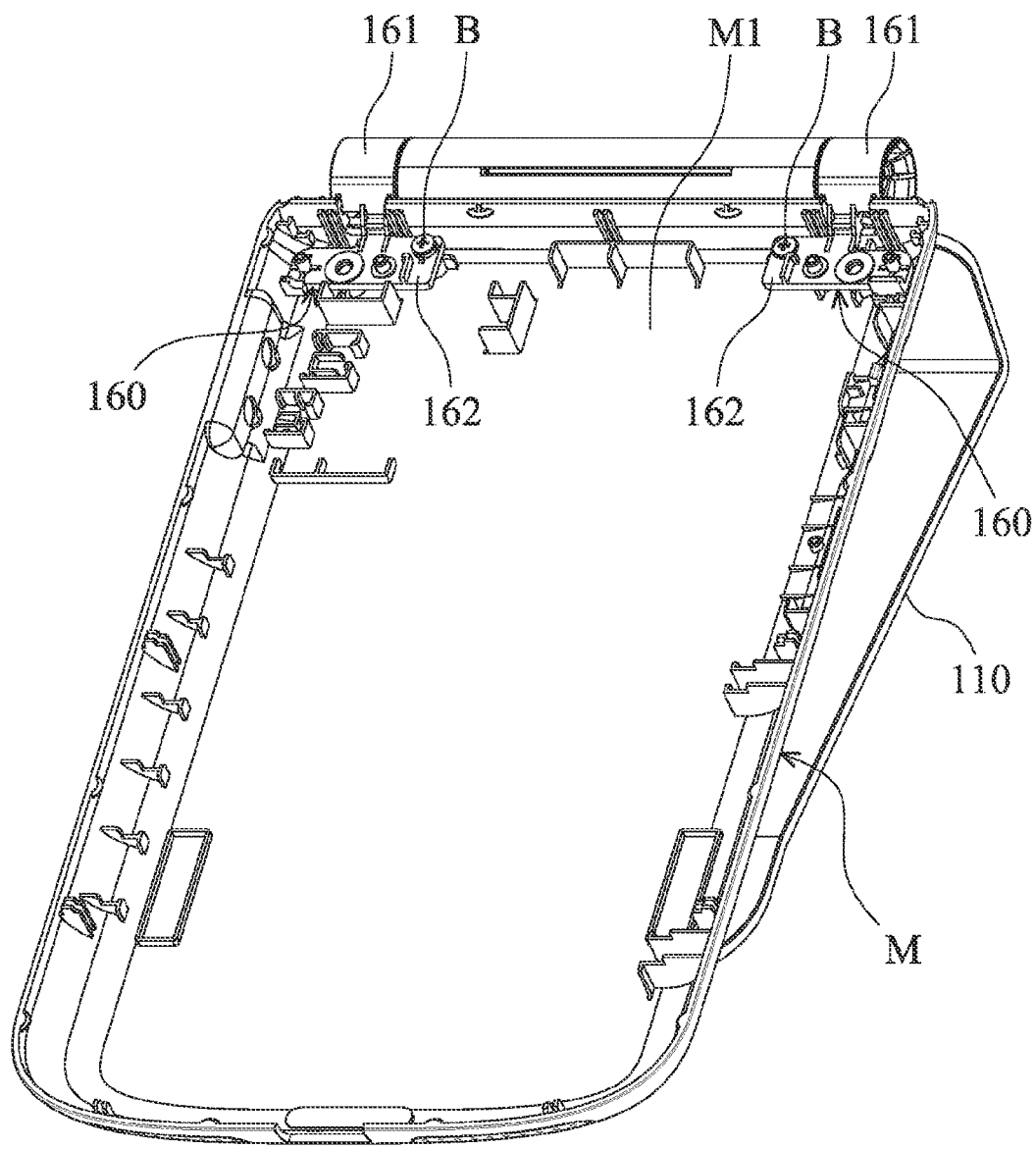
FIG. 9 is still another schematic view showing the assembly process of the protection cover mechanism of the invention.

As shown in FIG. 9, the fixing bases 160 are fixed to a casing M1 of an operational device M (e.g. a cellular phone, a tablet computer, etc.) through the fixing portions 162. Specifically, the fixing portions 162 are fastened to the casing M1 by bolts B.

Figure 10:
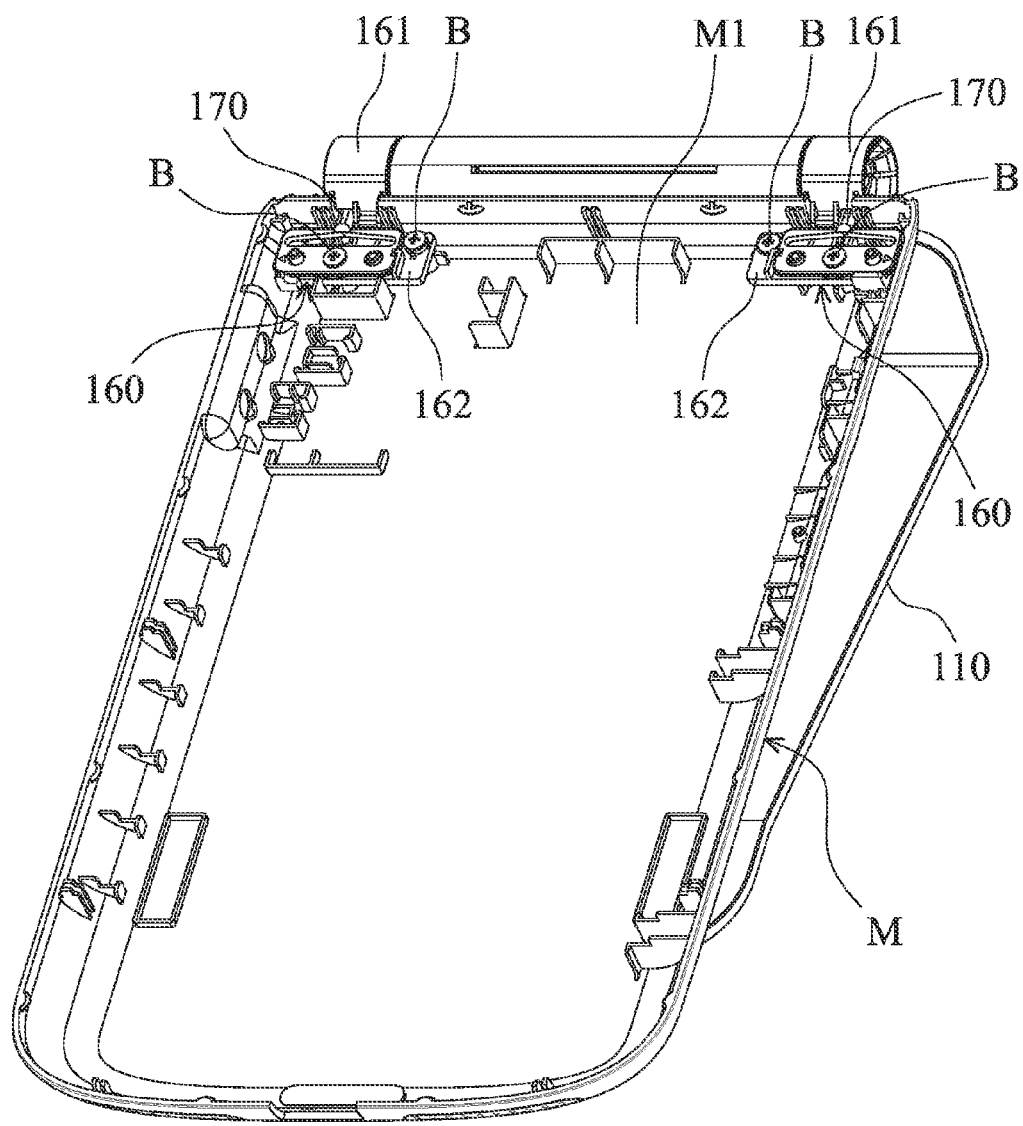
FIG. 10 is still another schematic view showing the assembly process of the protection cover mechanism of the invention.

As shown in FIG. 10, the resilient tenons 170 are respectively fit in the hollow tubes 161 of the fixing bases 160. Here, the stylus 180 is detachably fit in the hollow tubes 161 of the fixing bases 160, hollow driven members 150, springs 140, and hollow hinge tube 120. Additionally, the stylus 180 can be detachably engaged with the resilient tenons 170. Namely, the stylus 180 can be fixed in the hollow tubes 161 of the fixing bases 160, the hollow driven members 150, the springs 140, and the hollow hinge tube 120 by engagement of the resilient tenons 170. Moreover, in this embodiment, the resilient tenons 170 are respectively fastened to the fixing portions 162 of the fixing bases 160 by the bolts B.

Figure 11:
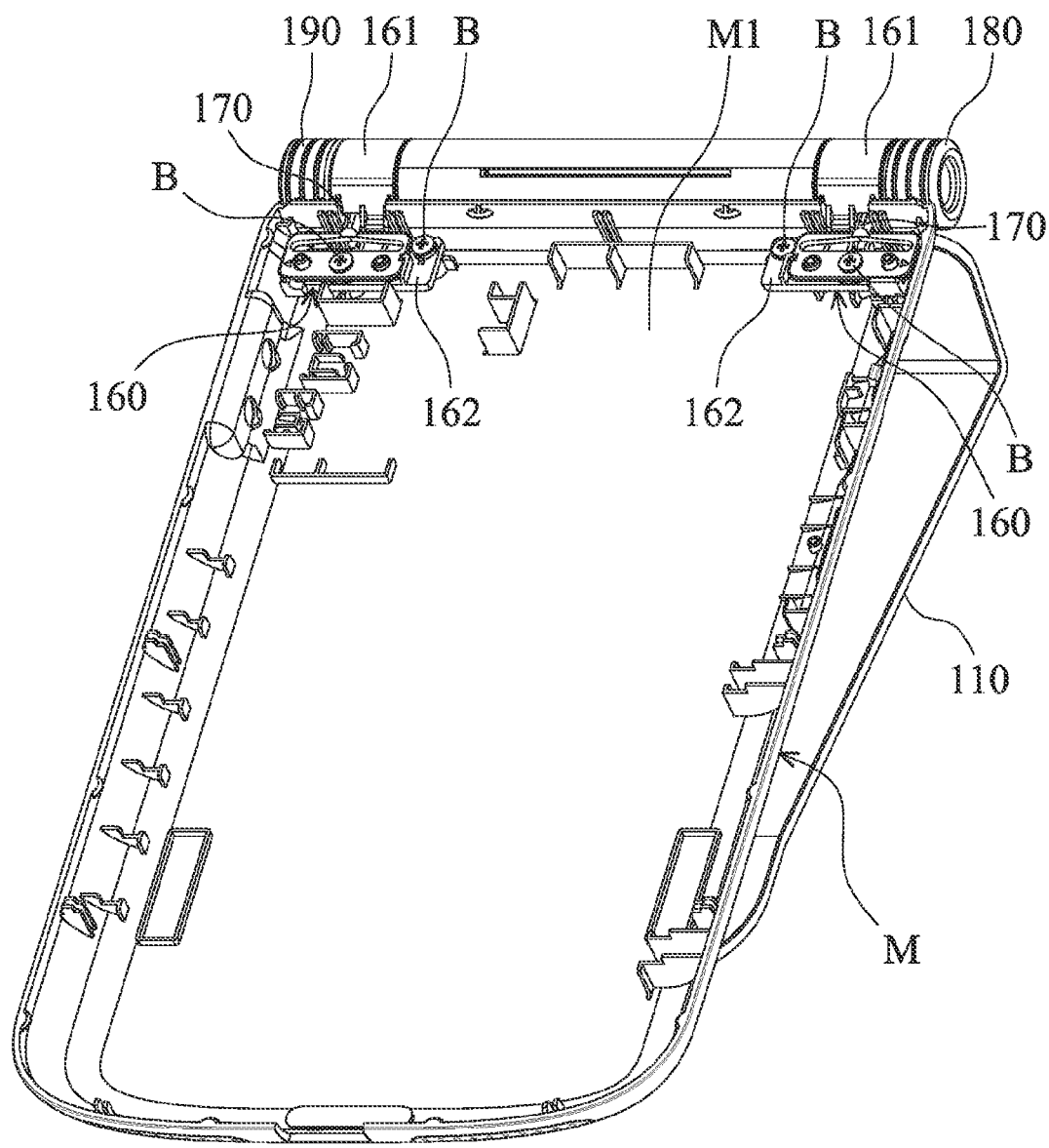
FIG. 11 is still another schematic view showing the assembly process of the protection cover mechanism of the invention.

As shown in FIG. 11, the hollow stylus cover 190 is connected to the hollow tube 161 of one of the fixing bases 160, enhancing integrity of an appearance of the protection cover mechanism 100.

Additionally, the protection cover mechanism 100 is not limited to having only the stylus 180. Specifically, related or other objects may replace the stylus 180 to be arranged in the protection cover mechanism 100, providing flexibility of application.

Accordingly, in addition to providing the clicking effect for the operator during the turning operation of the protective cover 110, the protection cover mechanism 100 can also utilize an inherently existing space to accommodate the stylus 180 or other related objects, and the arrangement of the stylus 180 or other related objects does not interfere with the turning operation of the protective cover 110. Thus, the disclosed protection cover mechanism can be widely employed in various products with means of a protective cover.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A protection cover mechanism, comprising:
   a protective cover;
   a hollow hinge tube connected to the protective cover;
   a first hinge cover body connected to the hollow hinge tube and comprising at least one positioning rib;
   a spring disposed in the first hinge cover body and abutting the hollow hinge tube;
   a hollow driven member movably disposed in the first hinge cover body and abutting the spring, wherein the spring is abutted between the hollow hinge tube and the hollow driven member, the hollow driven member comprises a protrusion, and the positioning rib of the first hinge cover body is positioned on the hollow driven member, forcing the hollow driven member to move linearly with respect to the first hinge cover body; and
   a fixing base comprising a hollow tube fit on the hollow driven member and having an annular inner guide track with an undulated profile, wherein the protrusion of the hollow driven member abuts the annular inner guide track, and when the protective cover rotates with respect to the fixing base, the protrusion of the hollow driven member slides along the annular inner guide track of the fixing base and the hollow driven member forces the spring to be compressed and released.

2. The protection cover mechanism as claimed in claim 1, wherein the hollow tube further comprises a stopper connected to the annular inner guide track, limiting sliding of the protrusion of the hollow driven member.

3. The protection cover mechanism as claimed in claim 1, further comprising a resilient tenon fit in the hollow tube of the fixing base.

4. The protection cover mechanism as claimed in claim 1, further comprising a second hinge cover body connected to the first hinge cover body, wherein the first and second hinge cover bodies surround and cover the hollow hinge tube, spring, and hollow driven member.

5. The protection cover mechanism as claimed in claim 1, wherein the hollow hinge tube comprises a first engaging portion, and the first hinge cover body further comprises a second engaging portion engaging the first engaging portion.

6. The protection cover mechanism as claimed in claim 5, wherein the first engaging portion comprises a hole and the second engaging portion comprises a hook.

7. The protection cover mechanism as claimed in claim 5, wherein the first engaging portion comprises a hook and the second engaging portion comprises a hole.

8. The protection cover mechanism as claimed in claim 1, wherein the fixing base further comprises a fixing portion through which the fixing base is fixed to an operational device.

9. The protection cover mechanism as claimed in claim 3, further comprising a hollow stylus cover connected to the hollow tube of the fixing base.

10. The protection cover mechanism as claimed in claim 3, wherein the resilient tenon is fixed to the fixing base.

\* \* \* \* \*